United States Patent Office 2,766,250
Patented Oct. 9, 1956

2,766,250

CHLORINATION PROCESS

John Edson Gordon, Middlesex, and Fred Bernard Dorf, Plainfield, N. J., assignors to American Cyanamid Company, New York, N. Y., a corporation of Maine No Drawing. Application October 11, 1955,
Serial No. 539,915

4 Claims. (Cl. 260—294.9)

This invention relates to an improved method of chlorinating 2 - hydroxy - 3,4 - dicyano - 5 - nitro - 6 - methylpyridine. The chlorination of 2-hydroxy-3,4-dicyano-5-nitro-6-methylpyridine to replace the hydroxy group by chlorine is one of the steps in the synthesis of Vitamin $B_6$, which is otherwise known as pyridoxine. Because of the required high purity of the product and the high cost of materials used, maximum utilization of labor and, particularly, high yields are important. It has been proposed to use a method in which the starting material is suspended in ethylene dichloride and chlorinated with phosphorus trichloride and chlorine. By this process it is possible to obtain satisfactory yields of the order of 74–78%, but the cost is high, as the ethylene dichloride has to be recovered, and it is difficult to isolate the chlorinated product in satisfactory quality. This process, while theoretically attractive, is not economically satisfactory.

In an attempt to avoid the difficulties involved in the ethylene dichloride process, it has been proposed to use phosphorus oxychloride as a solvent. This process, when tried on a laboratory scale, can be operated satisfactorily; but, contrary to the usual experience, it cannot be transferred to large scale operation. When commercial sized equipment is used, for example autoclaves or kettles of 25 gallons or more, the yields drop drastically and the economic cost rises so high that the process cannot be used.

The present invention is directed to a process which permits marked economies on a large scale using chlorine and phosphorus trichloride for chlorination in phosphorus oxychloride as the solvent. Chlorine is passed into the mixture with phosphorus oxychloride and phosphorus trichloride in ratios ranging from 3:2 to 6:1. The invention involves two features which are of little or no importance when operating on a laboratory scale. The first feature is that the chlorine addition is maintained at the maximum rate; and the second feature is that the temperature is kept between 95–115° C. In practice the chlorine is passed in as fast as the equipment will allow but, in general, the addition time should not exceed two hours. It is not known why the extremely rapid introduction of chlorine and the maintenance of the high temperature during the chlorine addition result in so great an increase in yield in plant operation, whereas in the laboratory there are no such comparable increases. We believe, however, that a factor may be the possibility of local heterogeneity in the reaction conditions in different parts of the large commercial batch. Other factors may play a part, and it is not intended to limit the invention to any theory of action.

The manner of heating is not so critical, although, because of the extremely short time which is necessary for the chlorine addition, rapid heating means are necessary. We prefer to heat up the reaction mixture to reflux temperature before introducing the chlorine and maintain a rapid reflux throughout the chlorine introduction. However, it is possible to obtain improved results, although not quite optimum, by beginning the addition of chlorine before refluex has started. In such a case, however, the reaction mixture must be heated rapidly to reflux after the beginning of chlorine introduction.

Other characteristics of the operating conditions do not depart from good chemical engineering practice. Thus, of course, thorough agitation by rapid reflux or mechanical means or both is employed, and it goes without saying that the chlorine introducing equipment should introduce it in fine bubbles as is standard modern operating procedure for chlorinations. It is an advantage of the present process that ordinary chemical equipment is used and that ordinary operating conditions can be followed, the only differences lying in the higher temperatures and the extreme rapidity of chlorine addition.

Rapid reflux which maintains temperatures nearer the upper portion of the range given is desirable as it permits maximum reaction rates and hence chlorine introduction rates and at the same time appears to prevent formation of by-products, which are difficult to remove and which, in small amounts may act as catalyst poisons in subsequent steps of the synthesis of pyridoxine.

It is an advantage of the present invention that the isolation of the product is effected by ordinary means, that is, by cooling and drowning in a mixture of ice and water. The solid obtained filters readily in either a filter press or centrifuge and the full advantages in output from the extremely rapid chlorine introduction are obtained without any sacrifice by reason of more difficult isolation. In fact, under favorable conditions the reaction time may be about half of that formerly possible on a commercial scale.

The invention will be illustrated in greater detail in the following specific examples which represent extensive operation of a full scale commercial plant. As a result yields are given in ranges as, of course, no two batches give the identical yield.

*Example 1*

860 pounds of phosphorus oxychloride and 300 pounds of phosphorus trichloride are charged into a reactor provided with a reflux condenser. 270 pounds of 2-hydroxy-3,4-dicyano-5-nitro-6-methylpyridine are then added and the reactor closed. The batch is heated with agitation to a temperature of 92–94° C., reflux starting at a temperature of about 75–85° C. Chlorine introduction is begun as soon as reflux starts and is maintained at a maximum rate of from 1–2 lbs./min. through an efficient chlorine diffuser until 108 lbs. of chlorine have been added. Heat is maintained at the maximum which the refluxing capacity of the reactor permits.

After reaction is complete, it is cooled to a temperature of 20–25° C. and drowned in a mixture of 1600 lbs. of cold water and 1000 lbs. of ice. During the drowning an additional 5000–6000 lbs. of ice is added to prevent the temperature from exceeding 5° C. After drowning is complete, the drowned mixture is stirred at a temperature not exceeding 5° C. for several hours until the solid product is completely precipitated. The solid is then filtered on a filter press and washed with cold water. Yields are in the 60's, reaching as high as 68%.

Typical heating cycles for representative batches give the following results, reflux beginning just under 20 minutes after start of heating and reaching full reflux at 30 minutes. Chlorine addition is started at the start of reflux and is maintained for 105 minutes, the maximum temperature reached being 110° C.; the yield, 65.7%. In another batch in which reflux started at about the same time but chlorine addition was more gradual, lasting 120 minutes, the yield was 66.6%.

The above results compare with a yield of 49.1% where the chlorine addition took 195 minutes down to a yield of 20% where the same time was followed but the maximum temperature did not reach 94° until over two hours of heating and chlorine addition had elapsed.

*Example 2*

The procedure of Example 1 was followed but chlorine was introduced at the beginning of the heating period, the temperature being raised to 90° C. as fast as the equipment permitted, 40 minutes, and chlorine was added at the rate in Example 1 until 120 lbs. of chlorine were absorbed. The batch was cooled, drowned and the product isolated as is described in Example 1. The yield, while in the 60's, was slightly lower than the typical batches in Example 1.

We claim:

1. In a process of chlorinating 2-hydroxy-3,4-dicyano-5-nitro-6-methylpyridine with elemental chlorine the improvement which comprises effecting the chlorination in a reaction medium comprising phosphorus oxychloride and phosphorus trichloride in the proportion of from 3:2 to 6:1 at a temperature of approximately 95–115° C., the addition of chlorine being at a rate not materially below the maximum absorption rate.

2. The process of claim 1 wherein the chlorine is passed in during a period less than about 2 hours.

3. The process of claim 1 in which the reaction mixture is refluxed vigorously.

4. The process according to claim 3 in which the addition of chlorine is not started until reflux begins.

References Cited in the file of this patent

UNITED STATES PATENTS

| | | |
|---|---|---|
| 2,310,171 | Carlson | Feb. 2, 1943 |
| 2,399,347 | Harris | Apr. 30, 1946 |